(12) United States Patent
Everett

(10) Patent No.: US 6,257,444 B1
(45) Date of Patent: Jul. 10, 2001

(54) PRECISION DISPENSING APPARATUS AND METHOD

(76) Inventor: Alan L. Everett, 12928 Big Tree Rd., East Aurora, NY (US) 14052

( * ) Notice: Subject to any disclaimer, the term of this patent is extended or adjusted under 35 U.S.C. 154(b) by 0 days.

(21) Appl. No.: 09/253,147

(22) Filed: Feb. 19, 1999

(51) Int. Cl.[7] ....................................................... G01F 11/00
(52) U.S. Cl. ............................ 222/1; 222/333; 222/410; 222/411; 239/591
(58) Field of Search .................................. 222/410, 411, 222/333, 1; 239/591

(56) References Cited

U.S. PATENT DOCUMENTS 3,931,933 * 1/1976 Cairns et al. ........................ 239/591
5,605,251 * 2/1997 Retti .................................... 222/1

* cited by examiner

Primary Examiner—David A. Scherbel
Assistant Examiner—Christopher S. Kim
(74) Attorney, Agent, or Firm—Hodgson Russ LLP

(57) ABSTRACT

A precision dispenser comprising a housing having a longitudinal axis, a chamber therein and an outlet from which a controlled amount of fluid leaves the chamber to be deposited on a surface. An impeller is mounted within the housing about the longitudinal axis thereof and is provided with a plurality of parabolic shaped impeller blades located within the chamber. Fluid is supplied from a source to the spaces between the impeller blades, preferably by a passage extending longitudinally along the impeller to one or more orifices located in the impeller between the blades. The impeller is rotated by a controlled drive motor to rotate the blades within the chamber to force fluid from the chamber through the outlet for delivery to the surface.

15 Claims, 3 Drawing Sheets

PRECISION DISPENSING APPARATUS AND METHOD

BACKGROUND OF THE INVENTION

This invention relates to the art of precision dispensing of small quantities of fluid, for example, viscous material such as adhesive on circuit boards and other surfaces, and more particularly to a new and improved precision dispensing apparatus and method for accomplishing the foregoing.

One area of use of the present invention is dispensing small quantities of viscous material, although the principles of the present invention can be variously applied to dispensing other types of fluids. Systems and methods for the deposition of drops of adhesive, conductive epoxy, soldering paste, and other viscous fluids at discrete locations on various surfaces are used extensively in modern manufacturing techniques. Such systems include a fluid dispenser and computer controlled apparatus for directing the fluid dispenser to precise locations on any surface. The latter can include a gantry arrangement for X-Y axis movement of the dispenser, a moving table for use with a stationary dispenser and split axis systems for moving the table in one axis and the dispenser in the other.

One form of prior art precision dispenser is a time-pressure dispensing head wherein a pulse of controlled air pressure and time duration forces an amount of adhesive through a dispensing needle. This dispenser is the least costly but the least accurate with respect to the dispensed volume of adhesive. However, the time-pressure dispensing head may be fitted with valve and metering enhancements for improved control. Even so, changes in viscosity of the fluid being dispensed can adversely affect performance.

Another form of prior art precision dispenser is a piston pump dispensing head wherein adhesive flows into an accurately sized chamber, and a measured amount of adhesive is forced by a piston from the chamber through a needle-like dispensing tip. This dispenser is classified as a positive-displacement head. A highly accurate amount of adhesive is dispensed because the chamber contains a known amount of material and the positive displacement is highly controlled. This adhesive dispensing system is virtually unaffected by changes in viscosity of the fluid being dispensed. Examples of piston pump dispensing heads are illustrated in U.S. Pat. Nos. 4,572,103 and 4,941,428.

Still another form of prior art precision dispenser is the screw dispensing head, also called the Archimedes metering valve, in which a motorized auger screw controls the amount of adhesive dispensed. As the screw rotates within a cylinder of adhesive, an accurate amount is forced out through the needle-like dispensing tip. This dispenser offers continuous material feed and fast activation. The adhesive metering valve is somewhat affected by changes in adhesive viscosity, but not to the extent of the time-pressure dispenser. Precise control of the start/stop motion of the screw is an essential requirement for volumetric accuracy. In addition, the amount of material delivered by the Archimedes metering valve is determined by the volume defined by the space between the screw threads and the surface of the chamber in which the screw rotates. An example of the foregoing is illustrated in U.S. Pat. No. 5,564,606.

SUMMARY OF THE INVENTION

It would, therefore, be highly desirable to provide a new and improved precision dispensing apparatus and method of increased efficiency and which can deliver relatively greater volumes of fluid.

The present invention provides a precision dispenser comprising a housing having a longitudinal axis, a chamber therein and an outlet from which a controlled amount of fluid leaves the chamber to be deposited on a surface. An impeller is mounted within the housing about the longitudinal axis thereof and is provided with a plurality of parabolic shaped impeller blades located within the chamber. Fluid is supplied from a source to the spaces between the impeller blades, preferably by a passage extending longitudinally along the impeller to one or more orifices located in the impeller between the blades. The impeller is rotated by controlled drive means to rotate the blades within the chamber to force fluid from the chamber through the outlet for delivery to the surface.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
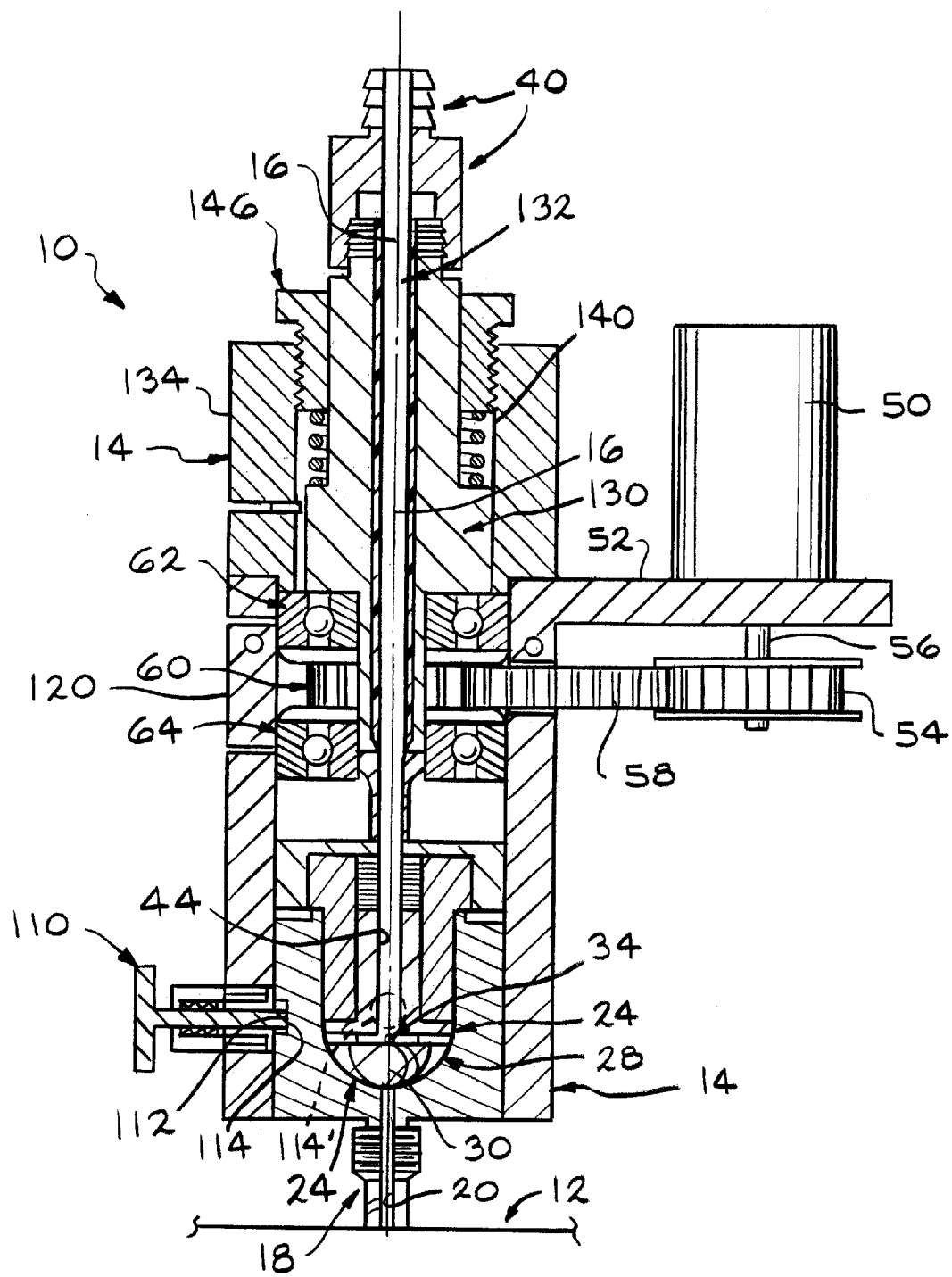
FIG. 1 is a longitudinal sectional view of the precision dispensing apparatus according to the present invention.

FIG. 1 illustrates a precision dispenser 10 according to the present invention for delivering small quantities of fluid to a surface generally designated 12. By way of illustration, the fluid can be a viscous material such as adhesive and surface 12 can be a circuit board. The dispenser 10 of the present invention can be used to deliver a variety of other fluids on different kinds of surfaces. Dispenser 10 is operatively connected to computer-controlled apparatus (not shown) for moving dispenser 10 to precise locations on any surface in a known manner. Once dispenser 10 is at a selected location it is moved toward the surface and in contact with it to deliver a controlled amount of fluid to the surface and then dispenser 10 is moved away from the surface, and moved to the next selected location all under computer control and in a known manner.

Dispenser 10 comprises a housing 14 having a longitudinal axis 16 which is disposed substantially perpendicular to the plane of surface 12 during operation of dispenser 10 illustrated in FIG. 1. The outlet of dispenser 10 is defined by a dispensing tip 18 or other outlet formation having a passage 20 through which fluid is forced out from dispenser 10 onto surface 12. One illustrative form of dispensing tip is shown and described in U.S. Provisional Patent Application No. 60/094,302 filed Jul. 27, 1998 and entitled "Quick Change Micro Dispensing Tip With Disposable Liner", the disclosure of which is hereby incorporated by reference. Passage 20 of dispensing tip 18 is in communication with a chamber 24 within housing 14. In accordance with the present invention, a parabolic bladed impeller 28 is rotatably mounted within housing 14 and is provided with a plurality of parabolic shaped blades 30 located within chamber 24. Rotation of impeller 28 to rotate blades 30 within chamber 24 forces or pumps fluid from chamber 24 out through passage 20 for delivery to surface 12. Also in accordance with the present invention, fluid is delivered to the spaces between blades 30 in chamber 24. Preferably this is done by an arrangement wherein fluid is fed along the impeller shaft and then radially outwardly between the impeller blades 30 through one or more orifices in the impeller body, one of which is shown at 34 in FIG. 1. Fluid is supplied to a fitting 40 on housing 14, in the present illustration located on the end of housing 14 opposite the outlet end, by a hose or conduit (not shown) leading from the output of a syringe in the form of a piston and cylinder arrangement (not shown) for supplying fluid. Such arrangements are well known to those skilled in the art, shown for example in the above-referenced U.S. Pat. No. 5,564,606, so that a detailed description thereof is believed to be unnecessary. A passage 44 extending longitudinally along impeller 28 places fitting 40 in fluid communication with orifice 34 so that fluid supplied to fitting 40 is fed out through orifices 34 to chamber 24. Impeller 28 is rotated in a controlled manner by a servo motor 50 carried by a flange 52 extending from housing 14. A gear 54 fixed to motor shaft 56 is drivingly coupled through a timing belt 58 to a gear 60 fixed to impeller 28 and located between bearings 62 and 64 in housing 14.

Figure 2:
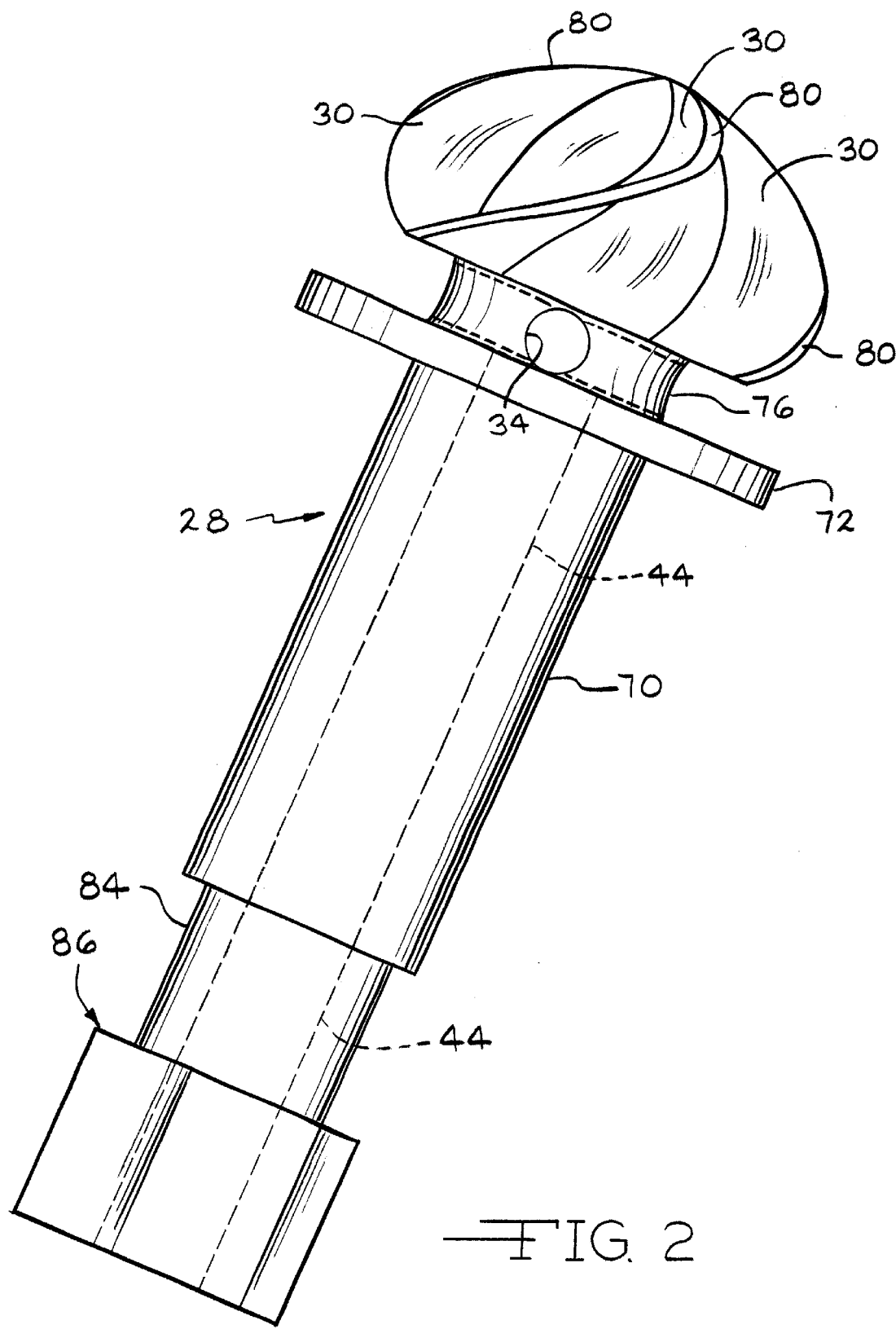
FIG. 2 is an enlarged perspective view of the impeller of the apparatus of FIG. 1.

Impeller 28 is shown in further detail in FIG. 2 and includes a cylindrical body portion 70 provided with an annular, disc-like flange 72 at one end. The parabolic shaped blades 30 are formed on an end portion 76 extending axially outwardly from flange 72. Each blade 30 may be viewed as having a shape of a paraboloid of revolution. In the present illustration four blades 30 are provided on impeller 28, but the number of blades can be varied depending upon the required operating parameters of dispenser 10. The blades have curved outer surfaces 80, and a major portion of the length of each surface 80 is in moving or sliding contact with the surface of chamber 24. Typically, one orifice 34 is provided between each pair of blades so that four orifices would be included in the illustrative apparatus of FIGS. 1 and 2. However, the number of orifices can be varied depending upon the required operating parameters of dispenser 10. Passage 44 extends longitudinally along impeller 28 and is open to orifices 34. Impeller body portion 70 meets a necked down portion 84 of smaller diameter which, in turn, meets an end portion 86 shaped to have flat surfaces, for example hexagonally shaped, to facilitate connection to gear 60 previously described.

Figure 4:
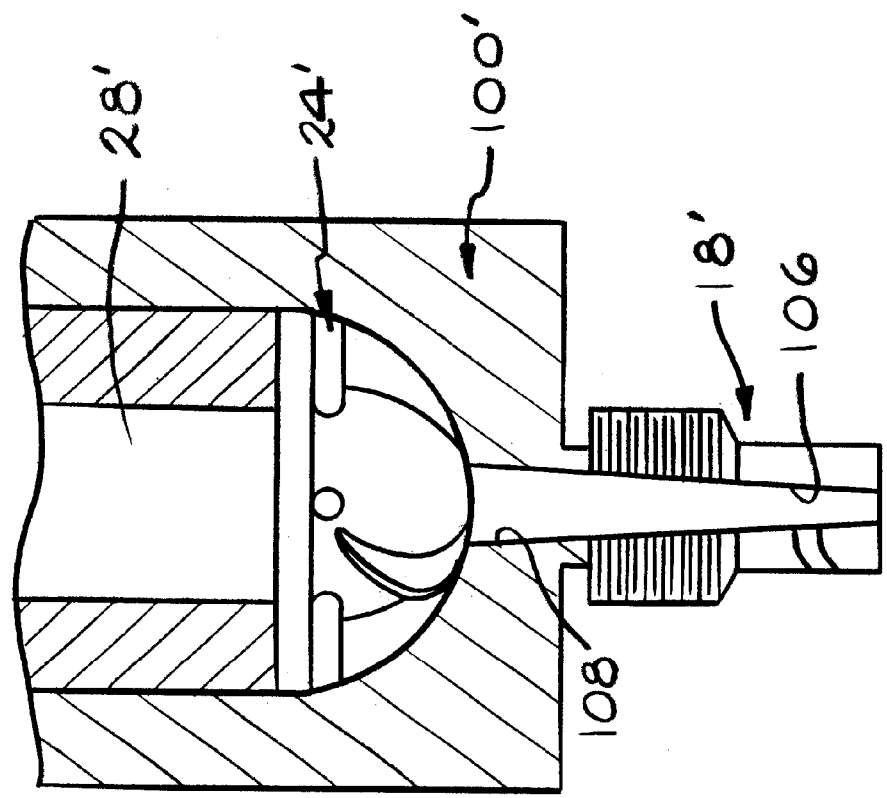
FIG. 4 is a view similar to FIG. 3 showing an alternative passage structure.
Figure 3:
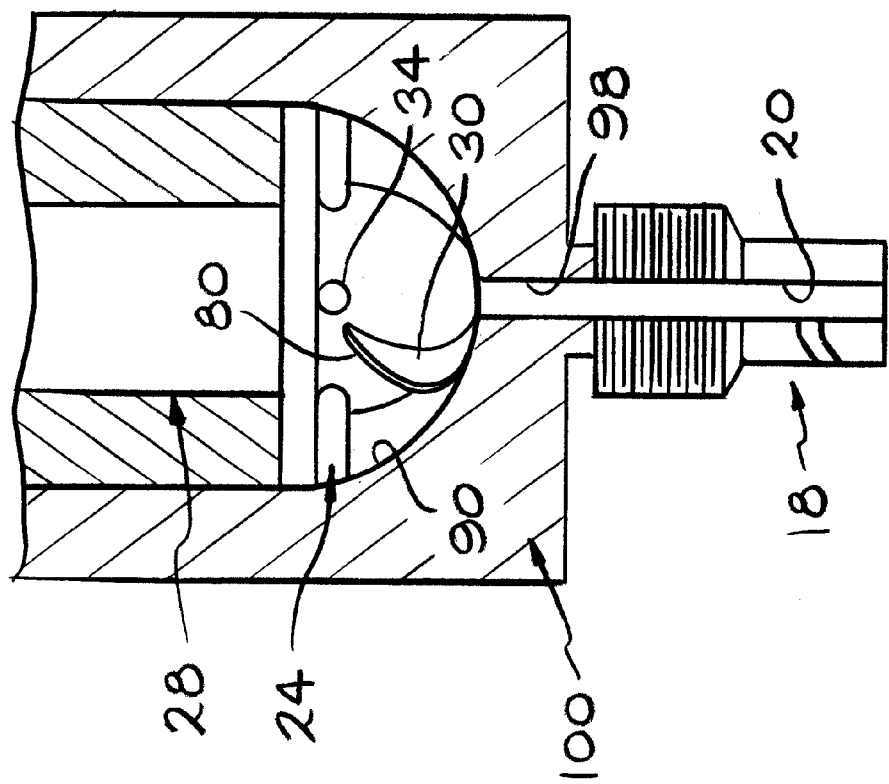
FIG. 3 is an enlarged, fragmentary sectional view of the chamber in the apparatus of FIG. 1.

FIG. 3 is an enlarged view showing chamber 24 and impeller blades 30 in more detail. The surface 90 of chamber 24 along which blade surfaces 80 move is smooth and continuous. This is important to provide a smooth, uninterrupted flow of material to outlet passage 20. Irregularities or discontinuities in the surface of chamber 24 could cause flow discontinuities. As shown in FIG. 3, outlet passage 20 of dispensing tip 18 is in alignment with a bore or passage 98 extending from chamber 24 in the body 100 which defines chamber 24. In the arrangement illustrated in FIG. 3, the passages 20 and 98 are of relatively constant diameter. FIG. 4 shows an alternative arrangement wherein a passage 106 in dispensing tip 18' and a passage 108 in body 100' define a taper, i.e. the diameter progressively decreases from the surface of chamber 24' to the end of dispensing tip 18'. In both arrangements, the surfaces of chambers 24, 24' and the surfaces of passages 20, 98 and 106, 108 are smooth and continuous, and passages 98 and 106 meet the surfaces of chambers 24 and 24', respectively, in corner radii, all for the purpose of avoiding any discontinuities in the fluid flow.

Referring to FIG. 1 body 100 is held in place by a rotary indexing pin 110 mounted in the wall of housing 14 and having an end or tip 112 which is received in a recess 114 in the surface of body 100. Rotation of pin 110 to move tip 112 out of recess 114 enables the sub assembly of body 100, dispensing tip 18 and impeller 28 to be removed easily from dispenser 10 for convenient maintenance. Also, body 100 is rotatably received in housing 14, and another recess 114' (shown in broken lines) can be provided in the surface of body 100 angularly displaced from recess 114, for example 90°, so that the rotational orientation of the sub assembly can be changed. This advantageously enables adjustment of the orientation of dispensing tip 18 when it contains two spaced apart passages instead of the single passage 20 of the present illustration. Thus, the outlet ends of two passages in tip 18 can extend along a line parallel to, perpendicular to or oblique to the plane of the paper as viewed in FIG. 1 by virtue of indexing pin 110 and recesses at appropriate angular locations on the surface of body 100.

Gear 60 and bearings 62, 64 provide a solid mounted, synchronous bearing drive system. Dispenser 10 can be mounted to the afore-mentioned computer-controller apparatus either by means of flange 52 on one side of housing 14 or by means of a mounting component 120 on the opposite side of housing 14. Additional mounting components can be provided at angularly spaced locations around housing 14 to facilitate mounting flexibility. A central body 130 is located within housing 14 between impeller 28 and fitting 40 and includes a central longitudinal bore or passage 132 for feeding fluid from fitting 40 to the longitudinal passage 44 in impeller 28. A tubular liner 134 of TEFLON™ (polytetrafluoroethylene) plastic or like material is removably fitted in passage 132. Liner 134 can be removed and replaced periodically for maintenance purposes. A coil spring 140 concentric with a section of body 130 provides a cushioning or biasing force when dispenser 10 and in particular tip 18 contacts surface 12 during application of fluid thereto. The force of spring 140 is adjusted by means of a bushing 146 threaded in the end of housing 14 for rotational movement therein.

In operation, as previously described, dispenser 10 is moved relative to surface 12 by computer-controlled apparatus for applying fluid such as adhesive to surface 12. When dispenser 10 is moved toward surface 12 to place dispensing tip 18 in contact with surface 12, motor 50 operates to rotate impeller 28 causing blades 30 to force a controlled amount of fluid from chamber 24 out through passages 98 and 20 to surface 12. The amount of fluid applied to surface 12 can be controlled by the number of rotations of impeller 28 per unit of time. After the desired quantity of fluid is dispensed, motor 50 is stopped and dispenser 10 is moved to the next selected location on surface 12 for application of fluid. If desired, motor 50 could be reversed before being stopped to control even more precisely the quantity of fluid dispensed. By way of further illustration, dispenser 10 can apply fluid to surface continuously along a linear or a curvilinear path in which case motor 50 would drive impeller 28 constantly as dispensing tip 18 is moved along the desired path over surface 12 by the computer-controlled apparatus. In an illustrative dispenser 10, an example of motor 50 is a Maxon motor with encoder, d.c. gear, step or brushless servo having a range of 5–500 r.p.m.

Rotation of impeller 28 to move blades 30 along the surface of chamber 24 increases the pressure on the fluid in chamber 24 to force it or pump it out through passage 98 to dispensing tip 18. The blade surfaces 80 move along surface 90 of chamber 24 in a wiping action to force or pack fluid out through passage 98. This is enhanced by the curvature of the portions of blades 30 which travel near the opening of passage 98. The action of impeller blades 30 in chamber 24 handles a relatively large volume of fluid in an efficient manner. Changing the pitch of impeller blades 30 can change the volume of fluid output. Increasing the pitch results in lower speed and greater force thereby providing a greater output volume. Decreasing the pitch results in higher speed and lower force thereby providing lesser output volume. While blades 30 in the impeller of the present illustration extend axially along a minor portion of the total axial length of impeller 28, it is within the scope of the present invention to provide elongated parabolic blades of relatively greater axial length which extend along a relatively larger portion of the total axial length of impeller 28.

The advantageous operation of impeller blades 30 is enhanced by the fluid feed between blades 30 provided by orifices 34. Providing a constant feed of fluid between all the blades simultaneously takes advantage of operation of all of the blades rather than feeding from one location to one blade at a time.

The closed loop nature of the fluid portion of the system enables dispenser 10 to operate with a wide variety of fluids. Stopping of impeller 28 does not introduce air bubbles into the fluid.

As an alternative to the arrangement shown in FIG. 1, fluid could be introduced first laterally from some location along the length of housing 14 and then into passage 44 of impeller 28. Furthermore, fluid could even be introduced through body 100 into chamber 24, if the foregoing advantages of the central/radial feed provided by orifice 34 were not desired. It is also within the scope of the present invention to incorporate the motor within housing 14 in which case a conduit or similar component would provide a fluid path from fitting 40 centrally through the motor armature to passage 44 of impeller 28.

It is therefore apparent that the present invention accomplishes its intended objects. While embodiments of the present invention have been described in detail, that is for the purpose of illustration, not limitation.

What is claimed is:

1. Precision dispensing apparatus for delivering a controlled amount of fluid to a selected location comprising:
    a) a housing having a longitudinal axis and a chamber therein and an outlet leading from said chamber for delivering fluid to said location, said chamber having a continuous surface curved in a direction alone said housing longitudinal axis and converging toward and to said outlet;
    b) an impeller rotatably mounted in said housing and including a body having an outer surface and a plurality of spaced apart blades located in said chamber and extending outwardly of and along said body of said impeller, each of said blades having an outer surface portion having a curvature substantially matching the curvature of said surface of said chamber;
    c) means for supplying fluid to said chamber between said blades;
    d) controlled drive means for rotating said impeller to move said blades within said chamber to force a controlled amount of fluid from said chamber through said outlet to said location; and
    e) the flow of fluid in said chamber to said outlet being defined exclusively between said blades and said outer surface of said impeller body and said surface of said chamber.

2. Apparatus according to claim 1, wherein each of said impeller blades defines a paraboloid of revolution.

3. Apparatus according to claim 1, wherein each of said blades is parabolic in shape.

4. Apparatus according to claim 1, wherein said impeller has a longitudinal axis about which said impeller is rotated and wherein said impeller has a plurality of blades located at equal angular locations about said longitudinal axis.

5. Apparatus according to claim 1, wherein said impeller has a body and said blades extend from an end of said body and wherein said means for supplying fluid to said chamber between said blades comprises a passage extending along said body of said impeller and at least one orifice in said end of said body located between a pair of said blades and in fluid communication with said passage.

6. Apparatus according to claim 5, wherein a plurality of orifices are provided, one between each pair of said blades.

7. Apparatus according to claim 1, further including a dispensing tip associated with said outlet.

8. Apparatus according to claim 1, wherein said chamber is defined by a body received in said housing and wherein said impeller and said body are removable from said housing as a sub assembly.

9. Apparatus according to claim 1, wherein said means for supplying fluid comprises a passage extending along said housing and wherein a disposable and removable liner is provided in said passage.

10. Apparatus according to claim 1, further including biasing mean in said housing for cushioning contact between said outlet and a surface to which fluid is applied and means for adjusting the force of said biasing means.

11. Precision dispensing apparatus for delivering controlled amounts of fluid to a selected location comprising:
    a) a housing having a chamber therein and an outlet leading from said chamber for delivering fluid to said location;
    b) an impeller rotatably mounted in said housing and including a plurality of blades located in said chamber;
    c) means for supplying fluid to said chamber between said blades;
    d) controlled drive means for rotating said impeller to move said blades within said chamber to force a controlled amount of fluid from said chamber through said outlet to said location;
    e) a dispensing tip associated with said outlet leading from said chamber; and
    f) indexing means for selectively changing the orientation of said dispensing tip.

12. Precision dispensing apparatus for delivering controlled amounts of fluid to a selected location comprising:
    a) a housing having a chamber therein and an outlet leading from said chamber for delivering fluid to said location;
    b) an impeller rotatably mounted in said housing and including a plurality of blades located in said chamber;
    c) means for supplying fluid to said chamber between said blades;
    d) controlled drive means for rotating said impeller to move said blades within said chamber to force a controlled amount of fluid from said chamber through said outlet to said location; and
    e) biasing means in said housing for cushioning contact between said outlet and a surface to which fluid is applied and means for adjusting the force of said biasing means.

13. A precision dispensing method for delivering controlled amounts of fluid to a selected location comprising:

a) providing a bladed impeller rotatably mounted in a housing having a longitudinal axis and a chamber in which the impeller blades are located and an outlet for delivering fluid from the chamber to the selected location, the chamber having a continuous surface curved in a direction along the housing longitudinal axis and conversing toward and to the outlet, the impeller having a body and the blades being spaced apart and extending from an outer surface of the body, each of the blades having an outer surface portion having a curvature substantially matching the curvature of the surface of the chamber;

b) supplying fluid to the chamber between the impeller blades; and c) rotating the impeller in a controlled manner to move the blades within the chamber to force a controlled amount of fluid under increased pressure from the chamber through the outlet to the selected location, the flow of fluid in the chamber to the outlet being defined exclusively between the blades and the outer surface of the impeller body and the surface of the chamber.

14. A method according to claim 13, wherein said step of supplying fluid includes providing a first path for fluid along the housing and the impeller and a second path for the fluid radially outwardly between the blades of the impeller.

15. A method according to claim 14, wherein a plurality of second paths are provided, are between each pair of the impeller blades.

* * * * *

UNITED STATES PATENT AND TRADEMARK OFFICE
CERTIFICATE OF CORRECTION

| | |
|---|---|
| PATENT NO. | : 6,257,444 B1 |
| DATED | : July 10, 2001 |
| INVENTOR(S) | : Everett |

It is certified that error appears in the above-identified patent and that said Letters Patent is hereby corrected as shown below:

<u>Column 5,</u>
Line 46, "alone" should be -- a long --.

<u>Column 7,</u>
Line 7, "conversing" should be -- converging --.

Signed and Sealed this

Twelfth Day of March, 2002

Attest:

JAMES E. ROGAN
*Attesting Officer*     *Director of the United States Patent and Trademark Office*